Nov. 28, 1950   S. KAIM   2,532,171
CAPACITOR WINDING MACHINE
Filed May 27, 1948   6 Sheets-Sheet 1
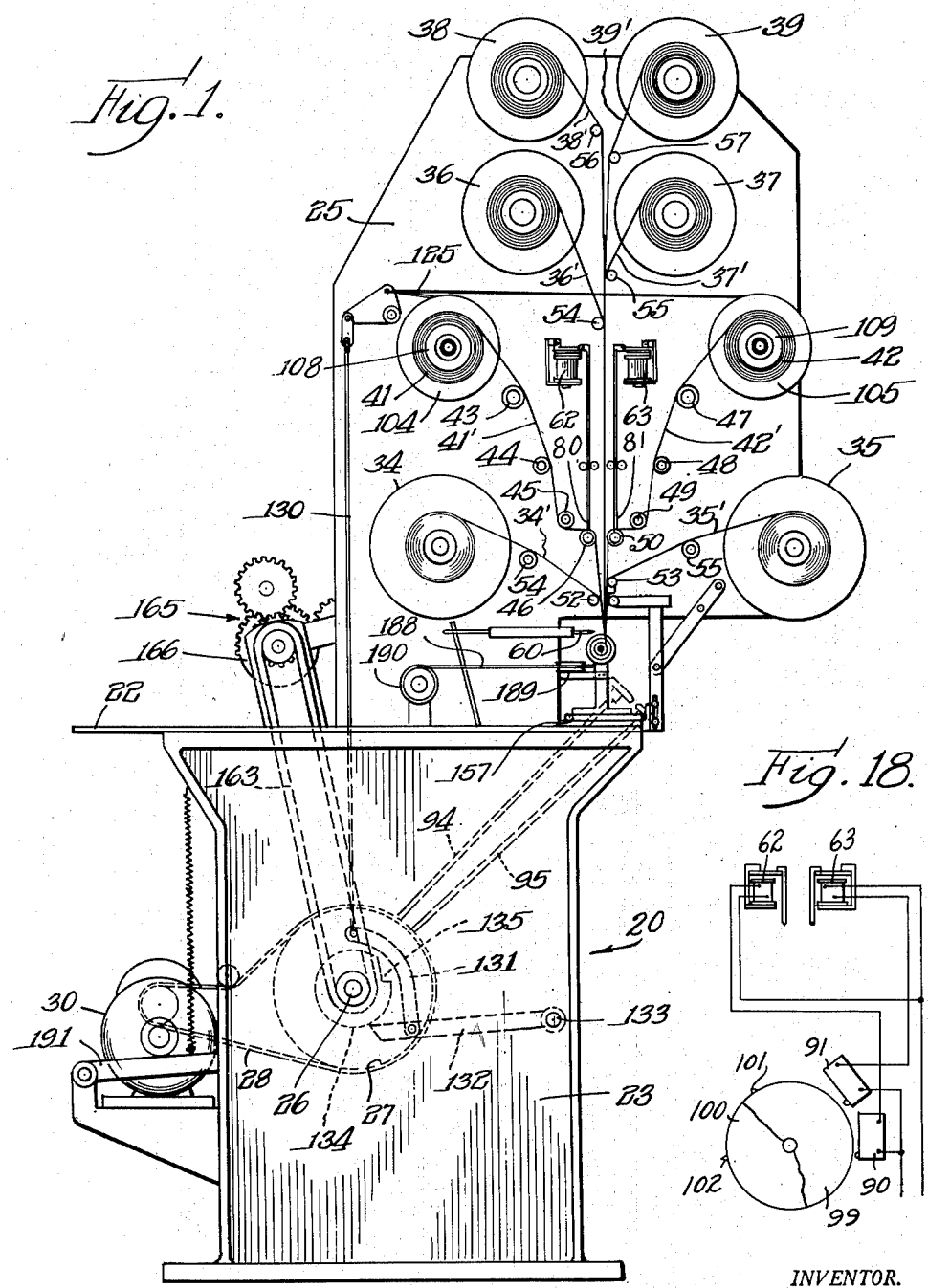
INVENTOR.
Simon Kaim
BY
Banning & Banning
Attys

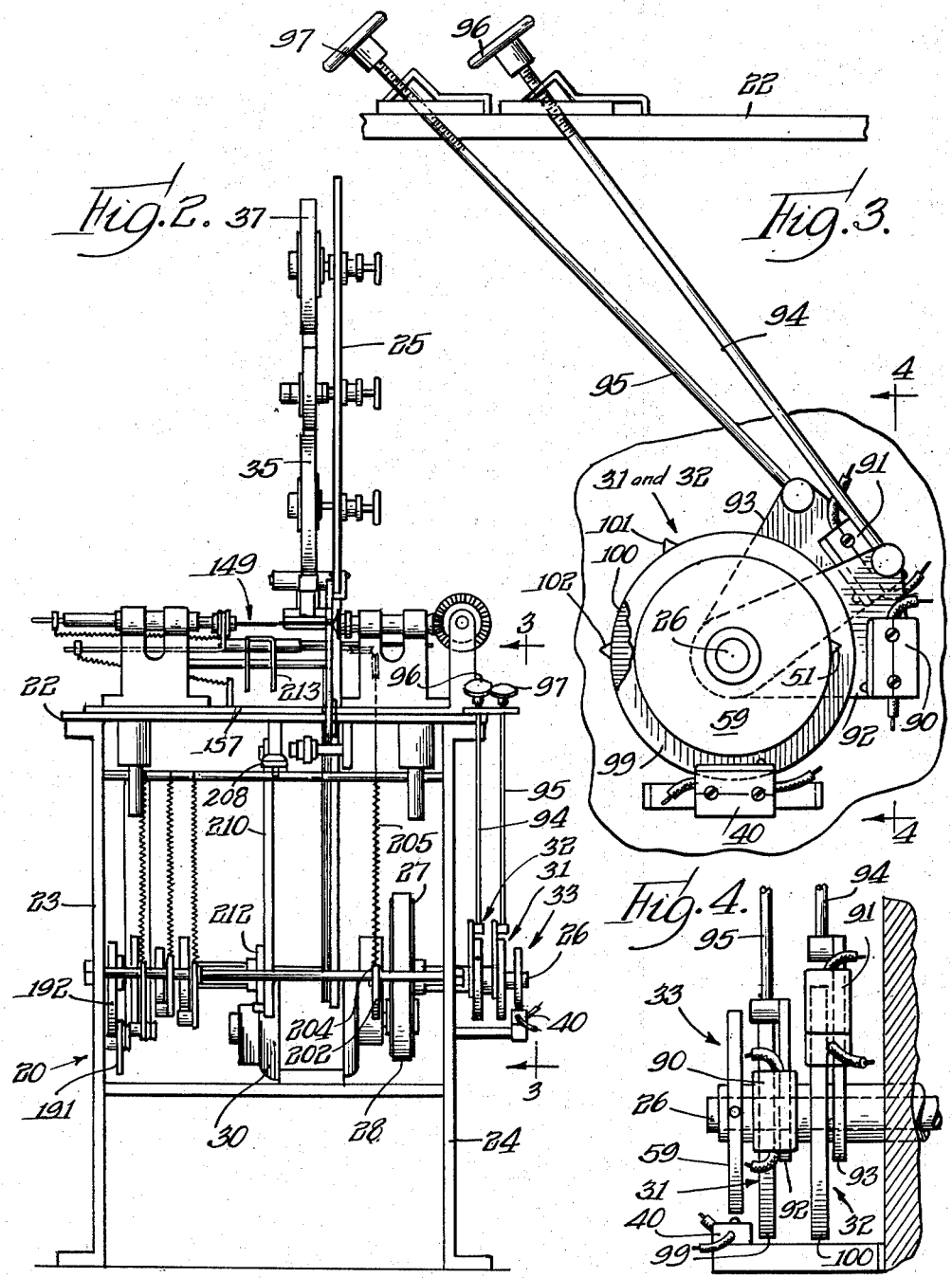

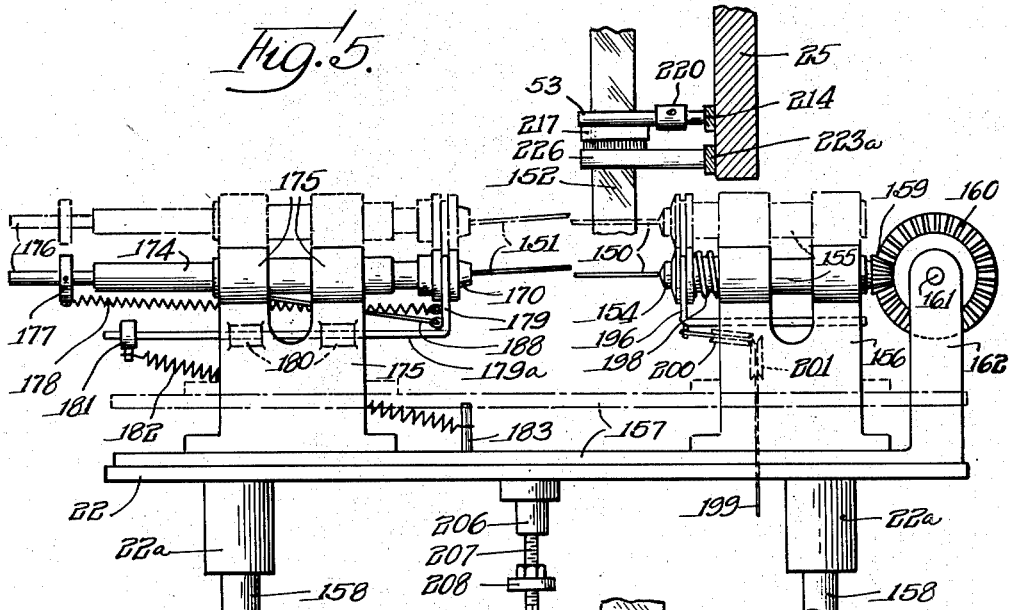
Fig. 5.
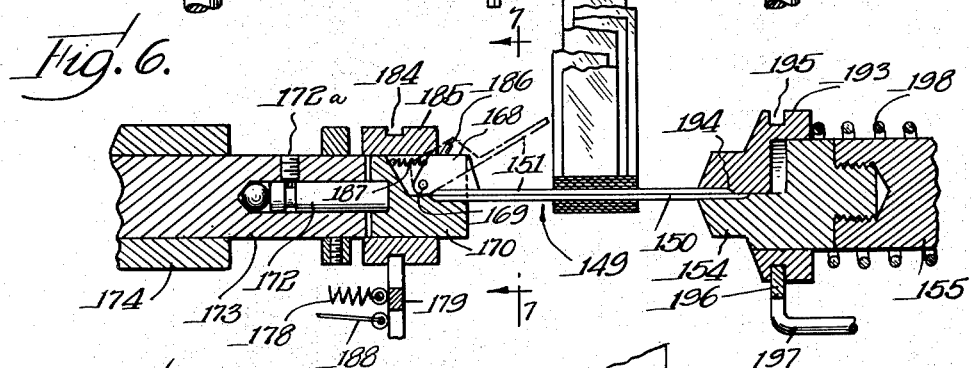
Fig. 6.
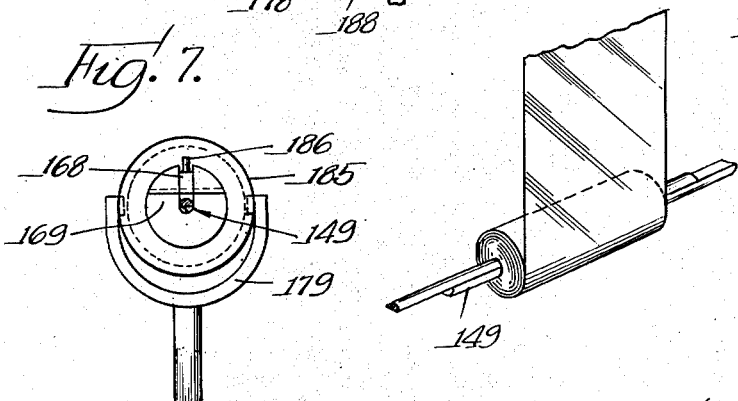
Fig. 7.
Fig. 8.
INVENTOR.
Simon Kaim
BY
Banning & Banning
Attys

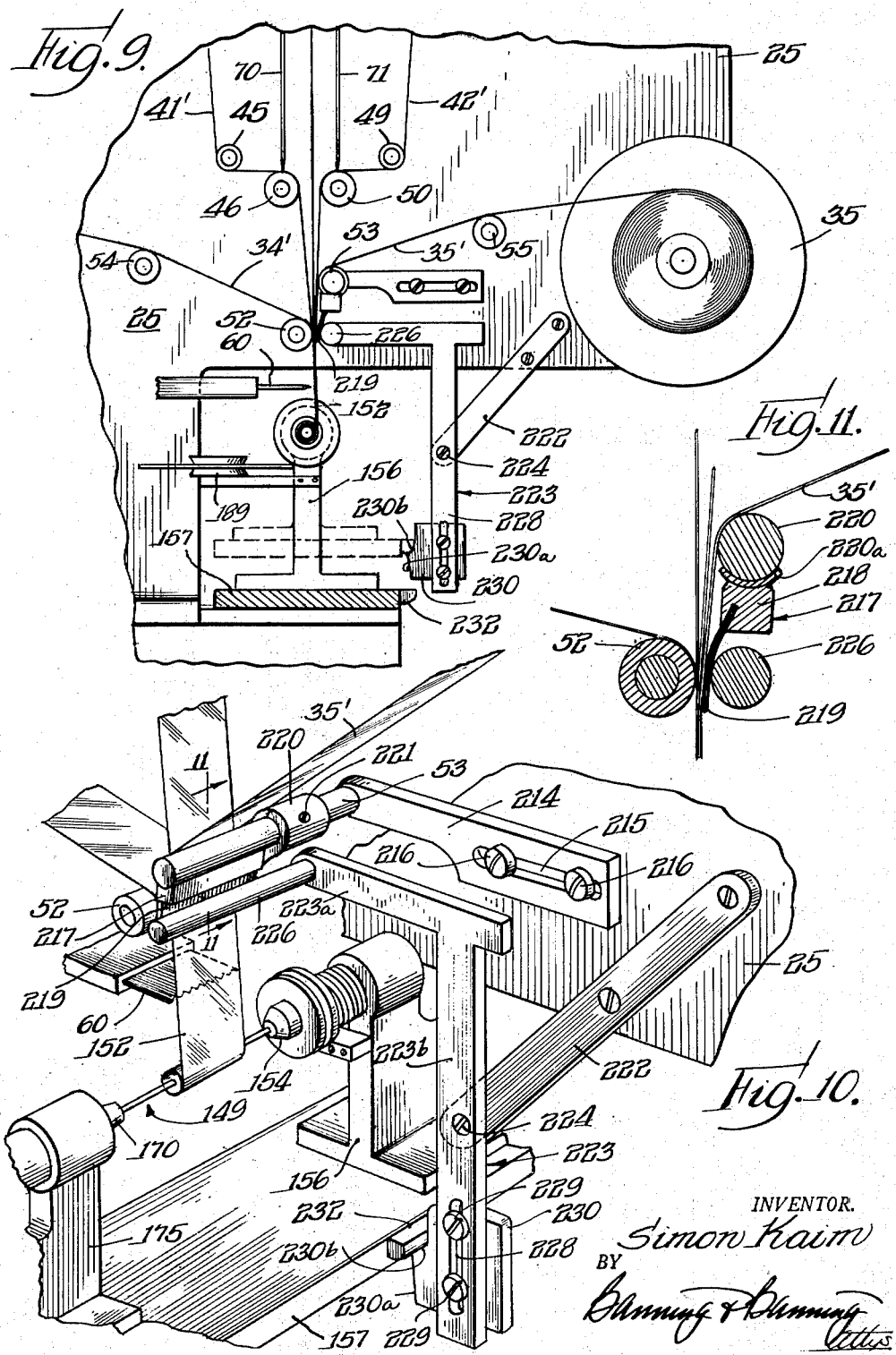

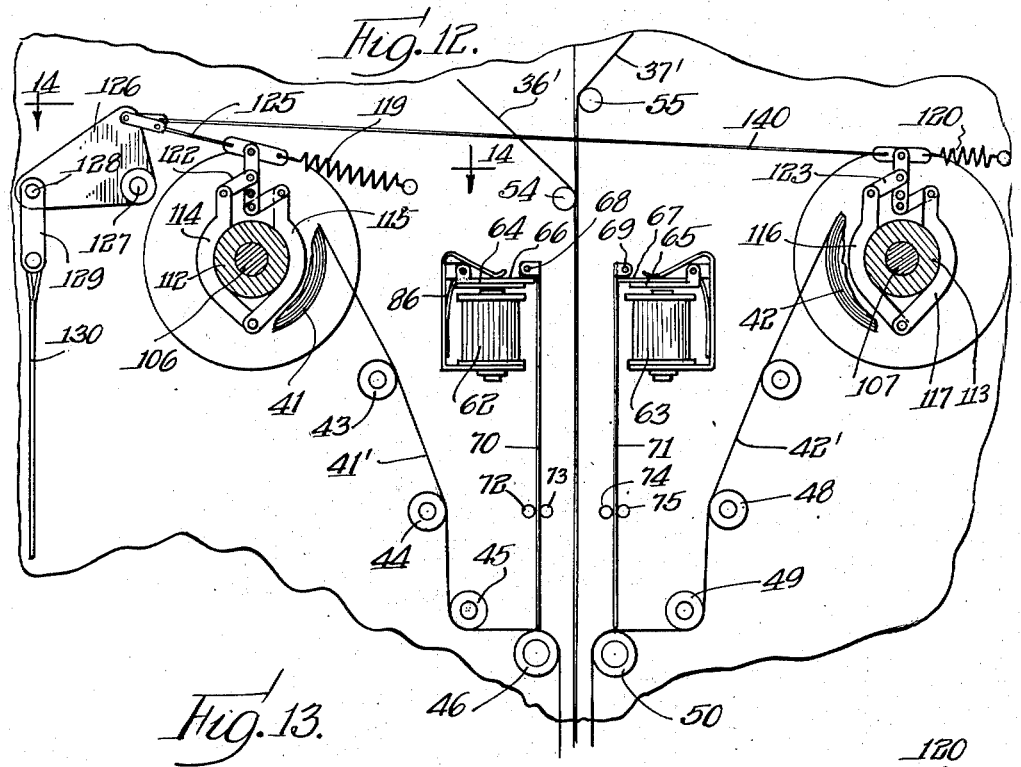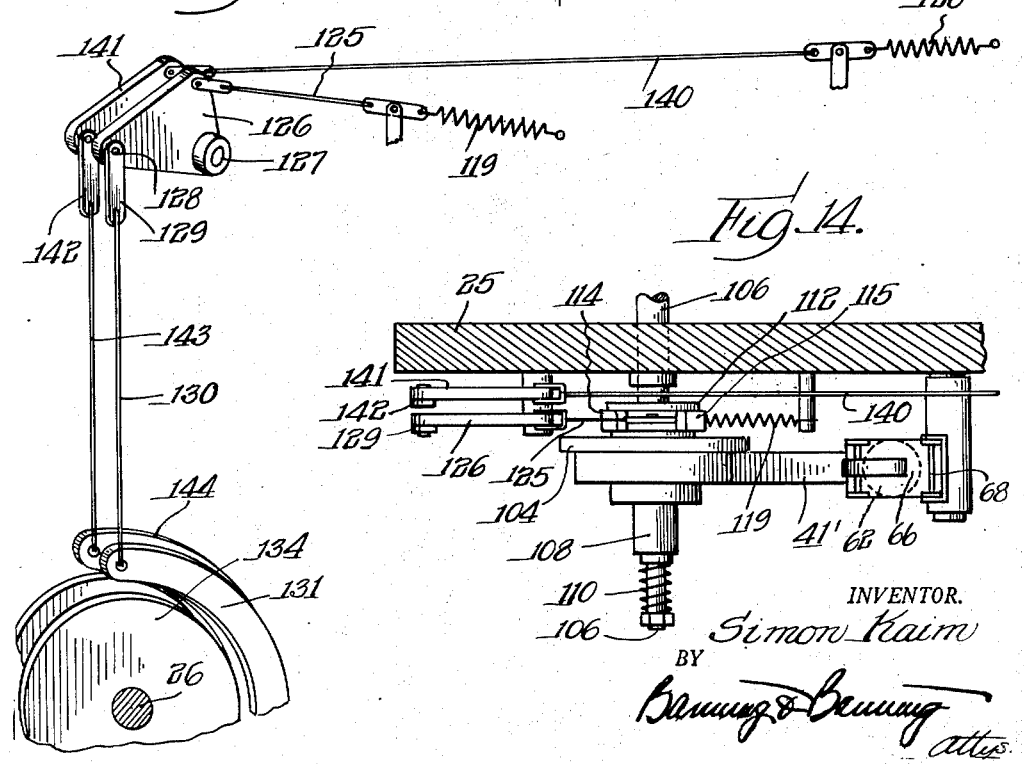

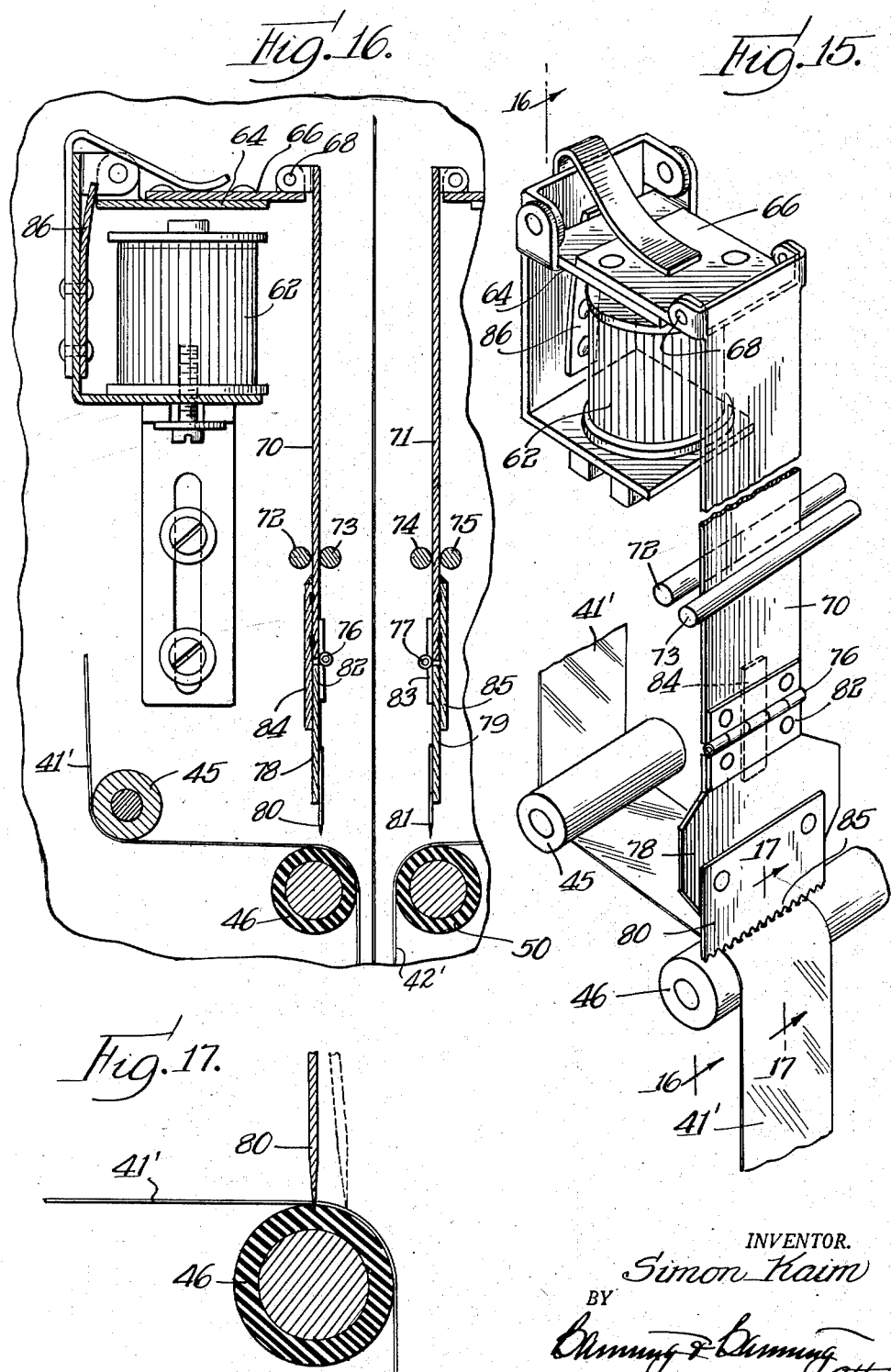

Patented Nov. 28, 1950

2,532,171

UNITED STATES PATENT OFFICE 2,532,171

CAPACITOR WINDING MACHINE

Simon Kaim, Chicago, Ill., assignor to John E. Fast & Co., Chicago, Ill., a corporation of Illinois Application May 27, 1948, Serial No. 29,466

10 Claims. (Cl. 242—56)

This invention relates to the manufacture of wound electrostatic capacitors, and it has to do more particularly with the manufacture of wound capacitors wherein the strips of metal foil constituting the plates are of unequal length; although one of the novel features hereinafter described and claimed is also useful where the strips of foil are of equal length.

A wound electrostatic capacitor comprises a roll made up of two or more superposed elongate ribbon-like strips or webs of metal foil, constituting the plates of the capacitor, interleaved with elongate ribbon-like strips or webs of paper or other equivalent thin flexible dielectric sheet material, the strips of foil being separated and insulated from each other by one or more layers of the dielectric material.

For electrical reasons, it is necessary that the strips of paper be longer than the strips of foil and that they overlap the foil strips at both ends; and in some cases it is desirable, also for electrical reasons, that the strips of metal foil overlap each other endwise, as well as being overlapped endwise by the paper strips. Those requirements give rise to a manufacturing problem which would not otherwise obtain, and the successful solution of this problem is the primary objective of the present invention.

Wound capacitors, such as are here dealt with, are required in the electrical arts, especially radio and television, in very large quantities; and in order to produce them economically they must be wound on machines which are, as nearly as practicable, fully automatic and adapted to run at high speeds. And it will be apparent that any avoidable stopping of the machines spells loss of production and increased production cost. Hence, in the interest of manufacturing economy, it is essential that the strips of metal foil be severed without stopping or slowing down the winding machines; and it is an inherent and inescapable circumstance that the strips of foil must be severed prior to severance of the paper strips to enable the latter to overlap the foil endwise.

In order to sever the foils prior to severance of the paper strips, and without stopping the machine, it is necessary first to perforate the foils at the points of severance and thereafter apply tension to the foils when the lines of perforation have reached appropriate positions in their courses of travel through the machine.

Based upon experience, it was until recently considered that the strips of foil could not successfully be perforated by mechanical means with the strips in motion. But more recently it has been found that the foil can successfully be perforated mechanically, while in motion, if the perforating tools are so designed and mounted that they move with the foil while in contact therewith. Such an arrangement, as heretofore proposed (see, for example, the co-pending application of Harry Dahl and Stephen D. Moreland, Serial No. 37,687, filed July 8, 1948) is adapted to sever the foil strips so that they are of equal length and co-terminous; but it is not operative to so sever the foil strips that they overlap each other endwise.

My primary object is to so modify the aforementioned mechanical method and apparatus for perforating and severing the foils as to enable the production of capacitors wherein the foils overlap endwise; and, further, to make it possible to adjust the winding machine so as to vary, at will, the extent of endwise overlap of the foils.

Another object is to provide an improved means for automatically gripping and releasing the multiple layer strand of paper and foil strips from which the capacitors are wound, in order to afford suitable slippage between the foil and paper strips, when slippage is required, and to afford adequate gripping engagement between the foil and paper strips when it is necessary for the foil and paper strips to be again put in motion conjointly with the paper strips. This phase of my invention, as well as that having to do with non-coincident perforation and severance of the foils can best be explained as an incident to the detailed description to follow.

In the drawings which accompany this specification:

Fig. 1 is an elevation of a capacitor winding machine;

Fig. 2 is an elevation of the same machine, viewed from the right-hand side of Fig. 1;

Fig. 3 is a detail view taken at line 3—3 of Fig. 2, showing the switches and switch-operating mechanisms which control the foil-perforating electromagnets;

Fig. 4 is a view taken at line 4—4 of Fig. 3;

Fig. 5 is an enlarged elevational view of the winding mechanism, including the mandrel on which the capacitors are wound;

Fig. 6 is an enlarged section taken lengthwise along the axis of the spindles of the winding mechanism;

Fig. 7 is a detail view taken at line 7—7 of Fig. 6;

Fig. 8 is an isometric view of a capacitor in process of being wound;

Fig. 9 is a fragmentary front elevation and sectional view illustrating the cutting-off step in the operation of the winding machine, and also showing, in elevation, the mechanism for gripping, automatically, the several strands of paper and foil;

Fig. 10 is an isometric view showing the winding mandrel with a partially wound capacitor thereon, together with the mechanism for automatically gripping and releasing the multiple strand of paper and foil strips, whereby the foil strips are allowed to slip to the proper extent, relatively to the paper strips, and, are then gripped between the paper strips so as to be pulled forwardly therewith;

Fig. 11 is an enlarged section at line 11—11 of Fig. 10;

Fig. 12 is a detail, partly in elevation and partly in section, of the perforating and braking mechanisms for the metal foil strips;

Fig. 13 is an isometric view of the brake operating cable connections;

Fig. 14 is a section at line 14—14 of Fig. 12;

Fig. 15 is an isometric view of one of the two foil perforating mechanisms;

Fig. 16 is a section at line 16—16 of Fig. 15;

Fig. 17 is an enlarged fragmentary section at line 17—17 of Fig. 15, depicting the movement of one of the perforating knives lengthwise of the foil; and Fig. 18 is a diagram of the electrical connections between the foil-perforating electromagnets and the controlling switches therefor.

The winding machine illustrated comprises a table 20 including a table top 22 supported on a pair of horizontally spaced legs or uprights 23, 24 and also includes an upstanding frame or panel 25 attached to and supported on the table top 22.

A countershaft 26 is bridged between and journaled on the two uprights 23, 24 and carries a pulley 27 by means of which it is connected through the medium of a driving belt 28 to an electric motor 30. This countershaft also carries a number of cams which perform certain functions, later to be described, together with a pair of switch mechanisms 31 and 32, the functions of which are to close circuits for energizing the actuating electromagnets of the foil-perforating knives at precisely the right instants, in coordination with the winding mandrel, and a switch mechanism 33, the function of which is to control the circuit of an electromagnet for actuating a cutting-off knife.

The machine illustrated is designed and set up to wind capacitors, each comprising two elongate strips or webs of metal foil separated by four thicknesses of paper, in the form of elongate strips, and disposed between two outer strips or webs of paper. The number of strips of paper between the strips of metall foil may be varied to conform to voltage breakdown specifications, and likewise the number of strips of paper outside the foil strips. The machine may be constructed to accommodate as many rolls of paper as the designer may see fit, thereby increasing or decreasing its flexibility as respects the range of capacitors which may be wound.

Both the paper and the metal foil are supplied in the form of rolls—the rolls of paper being identified by reference numerals 34—39, inclusive, while the rolls of metal foil are identified by reference numerals 41 and 42.. Each roll, whether paper or foil, is supported on a rotatable reel which, in turn, is mounted on a stud secured to the upright panel 25.

Two strands of metal foil 41' and 42' are fed from the rolls 41 and 42 respectively, the former being guided by guide rolls 43, 44, 45, and 46, while the latter is guided by guide rolls 47, 48, 49, and 50, to a position at which the two strands pass downwardly in face-to-face relation and thence between a guide roll 52 and a guide pin 53. Four inside strands of paper 36', 37', 38', and 39', fed respectively from rolls 36, 37, 38, and 39, are guided by guide rolls or pins 54, 55, 56, and 57 and pass downwardly through the space between the rolls 46 and 50 and thence between the two strands of metal foil 41' and 42' and between the guide roll 52 and guide pin 53. The outer strands of paper 34' and 35' are fed from the rolls 34 and 35, respectively, and over the guide rolls 54 and 55 and thence between the guide roll 52 and the guide pin 53, together with the two strands of metal foil and four inside strands of paper.

The winding of a capacitor is accomplished by means of a two-part mandrel, which grips the several strands of paper and foil depending below the guide roll 51—see especially Figs. 1 and 9-11—and then rotates, thereby causing the several strands of paper and foil to be payed out from their respective rolls.

Following a predetermined number of revolutions, depending upon the size of capacitor being wound, the mandrel stops rotating, and a cutting-off knife 60 is actuated automatically to sever the several strands of paper, the foils having already been severed, as presently will be explained, before the knife 60 is actuated. Operation of the knife 60 is effected periodically by means of an electromagnetic solenoid (not shown) which is included in circuit with a microswitch 40 forming a constituent part of the switch mechanism 33; the operation of this switch is timed to actuate the cutting-off knife just prior to completion of each capacitor winding operation.

As stated at the beginning of this specification, one of the objects of the invention is to provide for severing the strips of metal foil so that the corresponding ends of the two foils of each capacitor may be non-coincident—which is to say, that one foil overlaps the other endwise at each end of the winding; and further, so that the amount of endwise overlap of the foils can be adjusted to meet whatever specifications may be laid down. How the object is accomplished will now be explained.

Referring more especially to Figs. 12 and 15 to 17 inclusive, the guide rolls 49 and 50 preferably are rubber covered; and associated with each such roll is an electromagnet 62, 63, each having an armature 64, 65 to which is riveted a plate 66, 67, to which is pivotally connected at 68, 69 a depending plate or link member 70, 71, each of which is disposed between a pair of spaced guide pins 72, 73, and 74, 75 which are driven into the panel 25 to be operative for supporting their respective link members 70, 71 laterally while permitting free lengthwise movement thereof.

To the lower end of each link member there is pivotally connected at 76, 77 a depending extension plate 78, 79, to which are attached, respectively, two perforating knives 80, 81. The extension plates 78, 79 are attached to the link members 70, 71 through the medium of hinges 82, 83; and stop plates 84, 85 are secured, as by welding, to the link members 70, 71 to limit the movement, in one direction, of the extension plates 78, 79 and perforating knives 80, 81 about the pivotal center 76, 77. The free lower edges of the perforating knives 80 and 81 are serrated and sharpened, as most clearly illustrated at 85 in Fig. 15, and are thus adapted to perforate the strips of foil transversely, as said strips travel over their respective guide rolls 46 and 50. Normally, the armatures 64, 65 are retracted upwardly, away from the adjacent magnet poles, by leaf springs 86, 87, so that the perforating knives are suspended above and out of contact with the foil strips, as depicted in Fig. 16; but, upon energization of either of the two electromagnets, the associated perforating knife is moved abruptly, for a brief instant, into contact with the adjacent strip of foil—the rubber covering of guide roll 46, 50 acting as a yieldable anvil to receive the blow and permit adequate penetration of the foil, while at the same time protecting the sharpened teeth against excessive dulling or blunting. When either perforating knife 80, 81 strikes the adjacent strip of foil, its serrated edge is carried along with the foil; and the knife, together with its supporting extension plate, is swung about the pivotal center 76, 77, as illustrated in Fig. 17, wherein the full line showing of the knife 80 indicates its position upon striking the foil, while the dotted outline indicates its position an instant later. Each energization of an electromagnet is of such brief duration that its knife is retracted before the perforating edge can travel any considerable distance with the foil and before there is any opportunity for the knife to drag on the surface of the foil. The knives 80, 81 and their supporting extension plates 78, 79 are of such small mass that they offer exceeedingly little inertia to being carried along with the foil, and there is, accordingly, no perceptible tendency to tear the foils.

The windings of the two electromagnets 62, 63 are included in separate circuits with individual microswitches 90 and 91 (Figs. 2-4) forming parts, respectively, of the switch mechanisms 31 and 32. The two switches 90 and 91 are supported on individual mounting plates 92 and 93 which are pivotally mounted on the countershaft 26, but not secured thereto; and to each said mounting plate there is connected an adjusting screw 94, 95 equipped with handwheels 96, 97. By rotating the adjusting screws the angular positions of the mounting plates 92, 93 can be altered, thereby correspondingly altering the angular positions of the switches 90, 91 about the axis of the shaft 26. Two discs 99 and 100 secured to the shaft 26 and forming, respectively, parts of the two switch mechanisms 31, 32, are provided each with a radially projecting lug 101, 102 adapted, individually, to close the switches 90 and 91 momentarily, once per revolution of the shaft 26. The lugs 101, 102 are so spaced, rotatively, that they will close the two switches 90, 91, either simultaneously or sequentially, depending upon the rotative spacing between the switches. For example, if the two switches are positioned to form the same included angle as that between the two lugs 101, 102, the switches will be closed simultaneously. But with such an adjustment the two perforating knives would be actuated simultaneously, and ordinarily that is not desirable because it would result in no endwise overlap between the strips of metal foil. In order to obtain the desired overlap, the mounting plates 92, 93 are rotatively adjusted so as to space the two switches 90, 91 at an angle different from that between the lugs 101, 102. The greater the difference between the two angles the greater will be the extent of overlap. The degree of overlap can, obviously, be altered by moving only one of the switches 90 or 91; but it is also important to provide for varying the timing of both perforating operations so that the foils will be severed at the most favorable points, and for that reason both switches 90 and 91 are so mounted that they can be moved rotatively about the center of the shaft 26.

When the perforated lines of severance in the two strips of foil have traveled downwardly from the guide rolls 46 and 50 to positions wherein they can be gripped between the paper strips 34' and 35', in a manner to be explained later, brakes are applied individually and sequentially to the reels which carry the rolls 41 and 42 of metal foil, and the resultant added tension severs the strips of foil, one at a time, at the perforated lines of severance. In each instance the foil which is first to be perforated is the first to be severed, since its perforated line leads that of the other foil. The brakes are kept on just long enough to permit the severed ends of the foil to separate to whatever extent may have been determined upon; and thereafter the cutting-off knife is actuated to sever the six strips of paper along a line mid-way between the severed ends of the foil. The brakes are then released to permit the two strips of foil to be carried along with the paper strips during the next succeeding winding operation.

The reels for the two rolls of metal foil and the brake mechanisms therefor are shown in detail in Figs. 12–14. Said reels, identified, respectively, by reference numerals 104 and 105 (Figs. 1 and 14) are rotatably mounted on studs 106, 107 which are detachably secured to the panel 25. The rolls of metal foil 41 and 42 are held in place on their reels by means of flanged sleeves 108, 109 mounted on the studs 106, 107, and pressed against said rolls endwise by coil springs, one of which is shown in Fig. 14 and identified by the numeral 110. The sleeves 108, 109 serve not only to hold the rolls of foil on their respective reels but also as drag brakes to keep the strips of foil normally under suitable tension so that the rolls will not over-run.

Each reel 104, 105 has an integral brake drum 112, 113, each arranged to be acted upon by a pair of complementary brake levers 114, 115 and 116, 117, which are adapted to be contracted into engagement with the respective brake drums by coil springs 119, 120, acting thereon through linkages 122 and 123, the mode of operation of which is self-evident from Fig. 12. The brake linkage 122 is connected by means of a flexible cable 125 to a bellcrank 126 which is fulcrumed at 127 and pivotally connected at 128 to a clevis 129 which is attached at its lower end to a vertically extending flexible cable 130. The lower end of the cable 130 is connected to a rigid arcuately curved arm 131 the lower end of which is rigidly attached to a lever 132, fulcrumed at 133 (Fig. 1) and bearing against the periphery of a disc cam 134 (Figs. 1 and 13) having a peripheral notch 135 (Fig. 1). Throughout the major portion of each revolution of the shaft 26 the lever 132 bears against the circular surface of the cam 134 and thus holds the cable 130 under tension against the opposed action of the spring 119, thereby maintaining the brake levers 114 and 115 out of engagement with the brake drum 112. When the shaft 26 and cam 134 have rotated to the position wherein the lever 132 registers with the notch 135, the free end of the lever moves upwardly into said notch, under the influence of the spring 119, and the latter thereupon applies the brake to the brake drum 112, abruptly stopping the reel 104 and the roll of metal foil 41' carried thereby. This abrupt stoppage of the foil is effective to sever the foil at the line where it has just previously been perforated in the manner hereinbefore described. But at the time the brake is applied the perforated line of severance has moved down to a point well below the guide rolls 46 and 50 where the depending severed ends can afterward be gripped, as will later be more fully explained.

The brake linkage 123 is connected by means of a flexible cable 140 to a bellcrank 141 (Fig. 13) situated behind the bellcrank 126 and identical therewith. The bellcrank 141 is connected by means of a clevis 142 to a vertically extending flexible cable 143, corresponding to the cable 130, and connected at its lower end to a rigid arcuately curved arm 144 (see Fig. 13) corresponding in all respects to the arm 131 and rigidly connected to a lever (not shown) which is situated to the rear of the lever 132 and identical therewith. The last-mentioned lever is engaged by a disc cam identical with the cam 134, but having its peripheral notch, corresponding to the notch 135, so situated that the brakes are applied to the brake drum 113 either sooner or later than they are applied to the brake drum 112. The spacing of the brake applications usually is made to conform to the spacing of the action of the perforating knives so that the severance of the foils will occur in proper sequence, and this may be accomplished by angular adjustments of the brake control cams. The timing of the brakes, as well as the timing of the perforating knives is entirely within the control of the machine setter, and it does not follow as a matter of course that the time spacing of the two brake sections would be the same in all cases as the time spacing between the successive actuations of the perforating knives, although that is the more usual practice.

The mandrel 149 upon which the capacitors are wound and the mechanism and the associated control and driving mechanism therefor are illustrated in detail in Figs. 5–8 inclusive. The mandrel consists of a rigid mandrel section 150 and a movable mandrel section 151. These mandrel sections are raised and lowered as indicated by the full and dotted line positions of Fig. 5. The mandrel section 151 is movable from the open or dotted line position of Fig. 6 to the closed or full line position therein shown. When the mandrel comes to rest in the full line position of Fig. 5, the fixed mandrel section 150 lies at the rear of the depending multiple strand 152 consisting of the six strips of paper 34'–39' inclusive, while the movable mandrel section 151 lies on the opposite side. At this point in the description it is presupposed that the six strands of paper have been severed by the cutting-off knife 60, although that operation has not yet been described. This accounts for the depending multiple strand 152, shown in Fig. 5—a completed capacitor having just previously been severed from the strips of paper and foil, and removed from the mandrel. By raising the mandrel sections bodily from the full line positions of Fig. 5 to the dotted line positions and then by closing the movable section 151, the two sections are caused to grip, conjointly, the depending multiple strand 152. The method of raising and lowering the mandrel sections will later be described.

The fixed mandrel section 150 is carried by a fixed mandrel head 154 which is secured to a shaft 155 journaled in a suitable bearing housing 156 carried on a platform 157. This platform is movable up and down as will later be explained; as indicated in full and dotted lines in Fig. 5, it is guided on rods 158 slidable in guides 22a on the table top 22. The method of raising and lowering the platform will later be explained, as will also the means for gripping the distal end of the mandrel section 151. The shaft 155 is secured against endwise movement and has a bevel pinion 159 (Fig. 5) meshing with a bevel gear 160. The latter is keyed to a shaft 161 which is journaled in suitable bearings 162. The shaft 161 is driven from the countershaft 26 through a drive chain 163 and a variable speed transmission 165 (Fig. 1) which includes an interrupted gear 166. Thus, it will be seen that with countershaft 26 running at a constant speed, the mandrel shaft 155 will be driven at a reduced speed part of the time and at an accelerated speed part of the time. The proportion of the total time during which the mandrel will remain stationary depends upon the design of the interrupted gear 166. Likewise, the number of turns the mandrel shaft will make per revolution of countershaft 26 depends upon the gears making up the gear train. The Geneva gear train comprising the interrupted gear 166 insures that the mandrel 150 will stop at the same position each time.

The movable mandrel section 151 (Figs. 5 and 6) is secured to a block 168 which is pivotally mounted by a pin 169 on a mandrel head 170, the latter being carried by a stub shaft 172 which is journaled in a shaft 173, rotatably and slidably journaled in a sleeve 174, carried by a support 175 on the platform 157. A rod 176 forms a reduced section of the shaft 173, and has adjustably mounted thereon a collar 177 to which is secured one end of a tension spring 178, the opposite end being connected to a yoke 179 which has a straight portion 179a slidably mounted in suitable bearings 180, and has a block 181 adjustably mounted on its opposite end. A tension spring 182 is connected at one end to the block 181 and at the other end to a pin 183 on the platform 157. The yoke 179 is bifurcated and engages an annular groove 184 in a sleeve 185, the latter being slidable over the shaft 173 and the mandrel head 170. The sleeve 185 bears against a pin 186 in the block 168. A tension spring 187 holds the pin 186 against the sleeve.

Spring 182 tends to hold the various parts in the full line position of Fig. 6 in which the mandrel sections are in overlapping relation and are locked together as will hereinafter be explained. A flexible member 188, Fig. 1, is connected to the yoke 179 and passes over suitable sheaves 189, 190 and over another (not shown), on a lever 191 which is adapted to be actuated by a cam 192 (Fig. 2) on the countershaft 26. The spring 182 tends to hold the parts shown in Fig. 5 against the tension of the flexible member 188 so as to maintain the latter taut at all times. As the cam 192 rotates, it acts through the flexible member 188 to retract the sleeve 185 and thus permit the mandrel section 151 to be moved by the spring 187 from the position shown in Fig. 6 to the position shown in Fig. 5, and as the cam further continues to rotate the spring 182 returns the sleeve 185 and mandrel section 151 to the position of Fig. 6.

The mandrel head 170 is adapted to receive the end of the mandrel section 150 as the former is moved to the right in Fig. 6, while the mandrel section 151 is still in the open or dotted line position. As the cam 192 continues to advance, the flexible member 188 permits the spring 182 to return the sleeve 185 to the full line position of Fig. 6, thereby moving the mandrel section 151 into the full line position of Fig. 6, and simultaneously gripping the distal end of the mandrel section 150.

The shaft 155, which carries the mandrel head 154 and the mandrel section 150, also carries a sliding mandrel head 193 which is slidably mounted on the mandrel head 154 and has a recess 194 adapted to overlie and engage the outer end of the mandrel section 151 in the full line position of Fig. 6 when the sliding mandrel head 193 is forced to the left, as there shown. This movement takes place after the two mandrel sections are closed. The sliding mandrel head 193 has an annular groove 195 therein which is engaged by a yoke 196 having a rod 197 which is slidably mounted in the bearing housing 156. A spring 198 between the housing and the sliding mandrel head normally forces the latter outwardly to the position shown in Figs. 5 and 6.

A flexible member 199 is secured at one end to the yoke 196 and passes over suitable sheaves 200, 201, Fig. 5, and is connected to a lever 202 (Fig. 2) which is fulcrumed to the table supports. The lever 202 is held in contact with a cam 204 (Fig. 2) on the countershaft 26 by means of a tension spring 205. Thus, at a predetermined point in the rotation of the countershaft 26, the cam 204 draws the sliding mandrel head 193 back against the action of the spring 198 and holds it there until the lever 202 suddenly drops off the point of the cam, thereby releasing the head 193 which is then returned by the spring 198 to the full line position of Fig. 6, thereby locking the end of the mandrel section 151 which has just closed to the full line position of Fig. 6. It is open just long enough to allow the mandrel section 151 to close and then be engaged.

For raising the platform 157 from the full line position to the dotted line position, the platform is provided with a centrally located pin 206 (Fig. 5) which passes through the table 22 and is adapted to be engaged by a screw 207 adjustably carried by a lever 208 which is fulcrumed to the table 22, the opposite end being pivotally connected to a link 210. The shaft 26 passes through a slotted opening in the link 210 so that the link is guided thereby. The link carries a cam follower which rides on a cam 212, locked to the shaft 26. Thus, the platform 157 remains in the full line position for more than half each revolution of the shaft, but is raised to the dotted line position for a predetermined portion of each revolution.

Starting with the parts as shown in full lines in Fig. 5, the mandrel section 150 lies back of the depending ends 152 of the paper and foil strips which go to make up the capacitor. The mandrel section 151 is retracted and open, as shown in dotted lines in Figs. 5 and 6. As the shaft 26 rotates, the cam 192 permits the flexible member 188 to be drawn back, thereby forcing the shaft 173 to the right. At the same time, the cam 212 acting on the link 210 lifts the platform 157 from the full line position (Fig. 5) to the dotted line position. In the latter position the two mandrel sections 150 and 151 lie one on each side of the depending multiple strand 152. At this time the sliding mandrel head 193 (Fig. 5) is retracted, as previously described. As the yoke 179 continues to move to the right, the shaft 173 moves with it until the collar 177 strikes the sleeve 174. This fixes the movement to the right of the mandrel section 151. The mandrel head 193 then is moved by the spring 198, as previously described, to lock the mandrel section 151. Continuing movement of the yoke 179 to the right stretches the spring 178 and moves the mandrel section 151 from the dotted line position of Fig. 6 to the full line position, thereby causing the sleeve 184 to engage the pin 186 and to close the mandrel section 151 on the mandrel section 150. The cam 204 then releases the tension on the flexible member 199, thereby permitting the spring 198 to return the sliding mandrel head 193 to the position shown in Fig. 6 in which it engages and locks the outer end of the mandrel section 151 to the mandrel section 150. At the same time the outer end of the mandrel section 150 is locked to the mandrel section 151 in the mandrel head 170. Following this, the mandrel shaft 155 is driven by the gear train 165. The two mandrel sections are locked together and are driven from the shaft 155, the mandrel head 170 rotating on its own stub shaft 172. This stub shaft is held in the shaft 173 by means of a dog point set-screw 172a in the shaft 173.

As the mandrel sections 150, 151 rotate, the paper and foil strips are wound about the mandrel, suitable tension being maintained on each strip by means of drag brakes applied to the respective rolls of paper and foil. As the winding continues, the cam 212 rotates so as to return the platform 157 to its lowered position. The winding then proceeds as long as the mandrel continues to be driven by the toothed portion of gear 166. When the winding is nearly complete, the metal foil strips are perforated, as previously described, and the brakes are thereafter applied to the brake drums 112, 113 to sever the metal foils, also as previously described, and the knife 60 is then actuated to cut the several strands of paper, thereby detaching the finished capacitor. The mandrel shaft 155 then stops, and immediately thereafter the mandrel section 151 is withdrawn from the fully wound capacitor which is retained on the mandrel section 150 by two spaced stripping fingers 213 (Fig. 2). The microswitch 60 (Figs. 3 and 4) which is included in circuit with the solenoid which actuates the cutting-off knife 60 is normally open and is closed momentarily once per revolution of the countershaft 26 by means of a lug 51 carried by and projecting radially from a disc 59 secured to and rotatable with the shaft 26. This switch and lug, together with the disc 59, constitute the switch mechanism 33.

While the shaft 155 and mandrel section 150 remain at rest, the fully wound capacitor is taped or glued by an operator, to prevent unwinding, and manually removed; or it may be secured and removed by automatic means, not shown.

In Figs. 9–11 inclusive there is illustrated a feature of the invention comprising a mechanism whereby squeezing pressure is applied to the several layers of paper and metal foil at the appropriate time, by virtue of which the strips of metal foil depending from the guide rolls 46 and 50, and terminating just below guide roll 52, are gripped between the outer and inner paper strips whereby to cause the foil strips, after severance by the cutting-off knife, to adhere to and move forward with the paper strips, but only after a desirable amount of slippage has occurred, as presently will be explained more fully. It already has been described how, at the beginning of each winding operation, the mandrel moves up from its lower position and grips the depending strips of paper 152 (Fig. 5) and is then rotated a few turns, after which the mandrel moves back down to its lower position while continuing to rotate. During this initial portion of the winding operation it is desirable that only the paper strips be wound on the mandrel, in order to build up a substantial thickness of insulation at the core of the capacitor; and this requires means that the strips of metal foil be prevented from moving forward with the paper strips until a suitable number of turns of paper have been wound on the mandrel. Such a result is accomplished by the mechanism now under consideration.

A horizontal bar 214, having an elongate slot 215, is secured to the panel 25 by means of clamping screws 216 which pass through the slot 215 for anchorage in the panel. This bar is adjustably movable lengthwise, to the extent permitted by the length of the slot 215, and there is secured to one end thereof the guide pin 53, to which reference has previously been made, said pin serving primarily as a guide for the paper strip 35', and secondarily as a supporting means for a brush 217 consisting of a metal back 218 of rectangular cross-section (see Fig. 11) and a row of bristles 219. Mounted on the guide pin 53 is a tubular brass sleeve 220, secured in place by a setscrew 221 (Fig. 10). The sleeve 220 is cut away so as to expose that part of the guide pin 53 which contacts the paper strip 35', except for a portion 220a which extends between said guide pin and the upper surface of the brush back 218, and to which portion said brush back is soldered or otherwise firmly secured. Normally, the row of bristles 219 bears lightly against the multiple strand of paper and foil strips in opposing relation to the guide roll 52, but does not exert enough pressure to engender sufficient adherence between the paper strips and the metal foil strips to cause the foil strips to be pulled along with the paper strips, following severance of the foil strips.

An obliquely extending bar 222 is rigidly secured to the panel 25 and forms a support for an inverted L-shaped rocker member 223 which is pivotally connected to said bar at 224. The horizontal arm 223a of the rocker member 223 carries a pin 226 which rests against the back side of the row of bristles 219, holding the same lightly against the multiple strand of paper and foil strips. If the L-shaped rocker member 223 is rotated counterclockwise, as viewed in Fig. 9, from its normal position, it will cause the pin 226 to bear against the row of bristles 219 with sufficient pressure to cause the metal foil strips to be gripped between the paper strips and thereby propelled with the paper strips onto the winding mandrel.

It is now in order to explain how the gripping of the foil strips, effected by the pressure applied thereto through the medium of the brush 217, is brought about at the predetermined time, viz. after the winding mandrel has engaged the multiple strand of paper strips 152 (Fig. 5) and has made a certain number of revolutions, and thereafter has started to move downwardly toward its normal lowermost position.

The vertical arm 223b of the rocker member 223 has an elongate slot 228 through which extends a pair of clamping screws 229 which are threaded into a cam follower plate 230, the latter being thus rigidly secured to the vertical arm 223b. Attached to the platform 157, or forming an integral part thereof, is a metal strip 232 which, when the platform rises to grip the paper strips, slidably engages a sloping cam surface 230a on cam follower plate 230, thereby rotating the rocker member 223 sufficiently to allow the strip 232 to pass. The upper end of the sloping cam surface 230a converges with the lower end of an oppositely sloping cam surface 230b. When the platform 157 has risen to the point where the strip 232 has passed the apex of the two sloping cam surfaces 230a and 230b, the rocker member starts rotating clockwise, as viewed in Fig. 9, thereby restoring the pin 226 to its normal position. The platform 157 continues to rise, so that the strip 232 has passed well above the aforementioned apex before the winding mandrel starts rotating. When the mandrel has gripped the multiple strand of paper strips and made a few turns, the platform, together with the mandrel, starts its downward movement. Thereupon, the strip 232, functioning as a cam, engages the sloping surface 230b, causing the rocker member 223 to again rotate counterclockwise. The result of this movement of the rocker member is to cause the pin 226 to exert pressure against the row of bristles 219, which pressure is effective to cause the two strips of metal foil to be gripped and moved along with the paper strips, to form constituent parts of the capacitor being wound. When the cam strip 232 has moved downwardly past the apex of the two sloping cam surfaces, the rocker member 223 rotates clockwise, thus returning to its normal position, thereby retracting the pin 226 and releasing the pressure of the brush 217 against the strips of paper and foil. Once the strips of metal foil have been started around the winding mandrel, there is no further need for the pressure exerted by the brush, until the commencement of the winding operation on the next capacitor.

Manifestly, it would be possible to dispense with the brush 217 and either utilize the pin 226 as a direct pressure element or, alternatively, to mount a roller on pin 226; but I have found that in so doing there is a tendency for the strips of paper to shift to one side or the other, which does not happen when the brush is employed.

It is obvious that various changes may be made in the specific embodiment set forth for purposes of illustration without departing from the principles of the invention. The invention is, accordingly, not to be limited to the precise details disclosed herein but includes all modifications thereof within the spirit and scope of the appended claims.

I claim:

1. The combination in a capacitor winding machine, of a rotary winding mandrel, means for feeding a plurality of strips of dielectric material and a plurality of strips of metal foil onto said mandrel, a plurality of perforating knives, one for each strip of metal foil, individually, a plurality of electromagnets, one for each of said perforating knives, individually, each said electromagnet being operative, upon energization, to move its associated perforating knife, individually, into perforating engagement with its associated strip of metal foil, individually, energizing circuits for said electromagnets, individually, a plurality of switches, each included in one of said circuits, individually, means co-ordinated with said mandrel for periodically closing said switches sequentially and momentarily, whereby to perforate said strips of foil following each completion of a predetermined number of revolutions of said mandrel, and brake means co-ordinated with said mandrel and operative upon said strips of foil, individually and independently, for abruptly stopping said strips of foil while said mandrel continues in rotation, whereby to sever said strips of foil sequentially, the arrangement being such that the contiguous ends of each severed strip of foil are spaced apart end-to-end, further, that the corresponding end portions of the foil strips of each completed capacitor are overlapped, lengthwise, each with the other or others, and a cutting-off knife operative to sever said strips of dielectric material between the contiguous spaced ends of said foil strips.

2. The combination in a capacitor winding machine, of a rotary winding mandrel, means for feeding a plurality of strips of dielectric material and a plurality of strips of metal foil onto said mandrel, a plurality of perforating knives, one for each strip of metal foil, individually, said knives being normally out of contact with their associated strips of foil, and each so mounted that it is movable into perforating engagement with the foil and then movable by and with the foil in the direction of movement of the foil until retracted from the foil, and thereafter movable back to the starting position, a plurality of electromagnets, one for each of said perforating knives, individually, each said electromagnet being operative, upon energization, to move its associated perforating knife, individually, into perforating engagement with its associated strip of metal foil, individually, energizing circuits for said electromagnets, individually, a plurality of switches, each included in one of said circuits, individually, means co-ordinated with said mandrel for periodically closing said switches sequentially and momentarily whereby to perforate said strips of foil following each completion of a predetermined number of revolutions of said mandrel, and brake means co-ordinated with said mandrel and operative upon said strips of foil, individually and independently, for abruptly stopping said strips of foil while said mandrel continues in rotation, whereby to sever said strips of foil sequentially, the arrangement being such that the contiguous ends of each severed strip of foil are spaced apart end-to-end and, further, that the corresponding end portions of the foil strips of each completed capacitor are overlapped lengthwise, each with the other or others, and a cutting-off knife operative to sever said strips of dielectric material between the contiguous spaced ends of said foil strips.

3. The combination in a capacitor winding machine, of a rotary winding mandrel, a shaft, transmission means for driving said mandrel from said shaft, supply reels and means for feeding a plurality of strips of dielectric material and a plurality of strips of metal foil from said reels onto said mandrel, said means including a plurality of rubber-covered guide rolls, one for each of said strips of metal foil, a plurality of perforating knives, one for each strip of metal foil, individually, said knives being normally out of contact with their respectively associated strips of foil, each of said knives being hinged so that its perforating edge is free to move with the foil when in contact therewith, said knives being adapted to return to their normal postures upon being released from engagement with their associated strips of foil, each of said rubber-covered guide rolls being so situated that it serves as an anvil for one of said perforating knives, a plurality of electromagnets, one for each of said perforating knives, individually, each of said electromagnets being operative, upon energization, to move its associated perforating knife, individually, into perforating engagement with its associated strip of metal foil, individually, energizing circuits for said electromagnets, individually, a plurality of switches, each included in one of said circuits, individually, a plurality of switch-operating means carried by said shaft and adapted periodically to close said switches momentarily and sequentially, and brake means actuable by said shaft in co-ordination with said mandrel and said switch-operating means and operative upon the foil supply reels, individually and independently, for abruptly stopping said strips of foil while said mandrel continues in rotation, whereby to sever said strips of foil sequentially, the arrangement being such that the contiguous ends of each severed strip of foil are spaced apart end-to-end, further, that the corresponding end portions of the foil strips of each completed capacitor are overlapped, lengthwise, each with the other or others, and a cutting-off knife operative to sever said strips of dielectric material between the contiguous spaced ends of said foil strips.

4. The combination in a capacitor winding machine, of a rotary winding mandrel, a shaft, variable ratio transmission means for driving said mandrel from said shaft, supply reels and means for feeding a plurality of strips of paper and a plurality of strips of metal foil from said reels onto said mandrel, said means including a plurality of rubber-covered guide rolls, one for each of said strips of metal foil, a plurality of perforating knives, one for each strip of metal foil, individually, said knives being normally out of contact with their respectively associated strips of foil, each of said knives being hinged so that its perforating edge is free to move with the foil when in contact therewith, said knives being adapted to return to their normal postures upon being released from engagement with their associated strips of foil, each of said rubber-covered guide rolls being so situated that it serves as an anvil for one of said perforating knives, a plurality of electromagnets, one for each of said perforating knives, individually, each of said electromagnets being operative, upon energization, to move its associated perforating knife, individually, into perforating engagement with its associated strip of metal foil, individually, energizing circuits for said electromagnets, individually, a plurality of switches, each included in one of said circuits, individually, a plurality of mounting plates, one for each of said switches, said mounting plates being fulcrumed on said shaft and rotatable thereabout, manually operable adjusting screws for adjustably rotating said mounting plates, together with the switches thereon, about the axis of said shaft, individually, a plurality of switch-operating means individual to said switches and carried by said shaft for closing said switches momentarily and sequentially, once per revolution of said shaft, and brake means actuable by said shaft in co-ordination with said mandrel and said switch-operating means and operative upon the foil supply reels, individually and independently, for abruptly stopping said strips of foil while said mandrel continues in rotation, whereby to sever said strips of foil sequentially at the points where they have previously been perforated by said perforating knives, the arrangement being such that the contiguous ends of each severed strip of foil are spaced apart end-to-end and, further, that the corresponding end portions of the foil strips of each completed capacitor are overlapped lengthwise, each with the other or others, and a cutting-off knife operative to sever said strips of paper between the contiguous spaced ends of said foil strips.

5. In a capacitor winding machine, a rotary winding mandrel, supporting structure for said mandrel whereby said mandrel is movable vertically between an upper and a lower limiting position, means for feeding downwardly to said mandrel a multiple strand consisting of dielectric strips interleaved with metal foil strips, said mandrel being operative in its upper position to grip said multiple strand and thereafter operative to return to its lower position, means for rotating said mandrel while the same continues to grip said multiple strand and during the downward movement of said mandrel, means operative to squeeze said multiple strand at a point above said mandrel, but normally ineffective so to do, and mechanism operative in response only to a portion of the downward movement of said supporting structure and simultaneously therewith to actuate the last-mentioned means, said last-mentioned means being effective, when actuated, to engender enough adherence between the foil and dielectric strips to cause the foil strips to move with the dielectric strips onto said mandrel.

6. In a capacitor winding machine, a rotary winding mandrel, supporting structure for said mandrel movable vertically with said mandrel between an upper and a lower limiting position, means for feeding downwardly to said mandrel a multiple strand consisting of dielectric strips interleaved with metal foil strips, said mandrel being operative in its upper position to grip said multiple strand and thereafter operative to return with said supporting structure to its lower position, means for rotating said mandrel while the same continues to grip said multiple strand and during the downward movement of said mandrel, a guide member for said multiple strand disposed above said mandrel, a normally inactive pressure element operative, when actuated, to press said multiple strand against said guide member with sufficient pressure to engender enough adherence between the foil and dielectric strips to cause the foil strips to move with the dielectric strips onto said mandrel, and cam means effective during a portion only of the downward movement of said mandrel supporting structure and in response thereto for momentarily actuating said pressure element.

7. In a capacitor winding machine, a rotary winding mandrel, supporting structure for said mandrel movable vertically with said mandrel between an upper and a lower limiting position, means for feeding downwardly to said mandrel a multiple strand consisting of dielectric strips interleaved with metal foil strips, said mandrel being operative in its upper position to grip said multiple strand and thereafter operative to return with said supporting structure to its lower position, means for rotating said mandrel while the same continues to grip said multiple strand and during the downward movement of said mandrel, a guide member for said multiple strand disposed above said mandrel, a rocker member, a normally inactive pressure element carried by said rocker member and operative, when actuated, to press said multiple strand against said guide member with sufficient pressure to engender enough adherence between the foil and dielectric strips to cause the foil strips to move with the dielectric strips onto said mandrel, and cam means on said rocker member actuable by said supporting structure during a portion only of each downward movement of said supporting structure, said cam means being effective, when so actuated, to rotate said rocker member and thereby move said pressure element into pressing engagement with said multiple strand.

8. In a capacitor winding machine, a rotary winding mandrel, supporting structure for said mandrel movable vertically with said mandrel between an upper and a lower limiting position, means for feeding downwardly to said mandrel a multiple strand consisting of dielectric strips interleaved with metal foil strips, said mandrel being operative in its upper position to grip said multiple strand and thereafter operative to return with said supporting structure to its lower position, means for rotating said mandrel while the same continues to grip said multiple strand and during the downward movement of said mandrel, a guide member for said multiple strand disposed above said mandrel, a brush comprising a row of bristles disposed adjacent said multiple strand and opposite said guide member, and means operative by said supporting structure during a portion only of each downward movement thereof for pressing said row of bristles against said multiple strand.

9. In a capacitor winding machine, a rotary winding mandrel, supporting structure for said mandrel movable vertically with said mandrel between an upper and a lower limiting position, means for feeding downwardly to said mandrel a multiple strand consisting of dielectric strips interleaved with metal foil strips, said mandrel being operative in its upper position to grip said multiple strand and thereafter operative to return with said supporting structure to its lower position, means for rotating said mandrel while the same continues to grip said multiple strand and during the downward movement of said mandrel, a guide member for said multiple strand disposed above said mandrel, a brush comprising a row of bristles disposed adjacent said multiple strand and opposite said guide member, a rocker member operative, when actuated, to press said row of bristles against said multiple strand, a cam follower carried by said rocker member, and cam means carried by said supporting structure and operative upon said cam follower to actuate said rocker member during a portion only of each downward movement of said supporting structure.

10. Mechanism in accordance with claim 9 wherein the rocker member is an inverted L-shaped element having a horizontal arm and a vertical arm, said cam follower being attached to said vertical arm and having a sloping cam surface which is engageable by the cam means during a portion of each downward movement of said supporting structure for rotating said rocker member in the direction effective to press the row of bristles against the multiple strand.

SIMON KAIM.

REFERENCES CITED

The following references are of record in the file of this patent:

UNITED STATES PATENTS

| Number | Name | Date |
|---|---|---|
| 2,205,171 | Kile et al. | June 18, 1940 |
| 2,384,983 | Weiss | Sept. 18, 1945 |